July 18, 1961 J. M. GOLDEY ET AL 2,993,154

SEMICONDUCTOR SWITCH

Filed June 10, 1960

INVENTORS J. M. GOLDEY
I. M. ROSS

BY

ATTORNEY

United States Patent Office 2,993,154
Patented July 18, 1961

2,993,154
SEMICONDUCTOR SWITCH

James M. Goldey, Scotch Plains, and Ian M. Ross, Summit, N.J., assignors to Bell Telephone Laboratories, Incorporated, New York, N.Y., a corporation of New York Filed June 10, 1960, Ser. No. 35,151
7 Claims. (Cl. 317—235)

Figure 1:
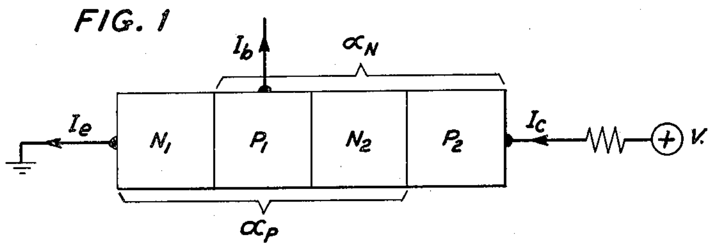

This invention relates to semiconductor devices and, more particularly, to PNPN semiconductor triode switches of the type capable of being switched readily between two extremes of impedance.

PNPN semiconductor switching elements of the regenerative type, that is, elements which will remain in either impedance condition without a continuously maintained application of control power, are disclosed, for example, in Patent 2,877,359 to I. M. Ross. Three-terminal PNPN switching elements of the type disclosed in the foregoing-noted patent are particularly advantageous because of their functional similarity to the gas tube thyratron by means of which small power pulses effectively control relatively large currents. However, although PNPN semiconductor triode switches can be transferred readily from the high impedance to the low impedance condition by applications of relatively small amounts of power to an intermediate region, it is generally acknowledged that the converse switching operation is more difficult. In other words, relatively larger amounts of power are required to turn off the PNPN triode than are necessary to turn it on.

Accordingly, an object of this invention is to facilitate switching of electrical signals and, particularly, to reduce the energy required to effect a complete switching operation.

Further, it is an object of this invention to adapt a PNPN semiconductor triode switch for more efficient regenerative switching from the low to the high impedance condition.

The characteristics of the PNPN semiconductor device are generally well understood in terms of the element as having a negative resistance characteristic as observed across the electrodes to the terminal regions of the element. This characteristic is disclosed in Patent 2,855,524, issued October 7, 1958, to W. Shockley. In the above-noted patent to Ross, the application of trigger pulses to one of the intermediate regions for the purpose of turning the device on to the conducting state by, in effect, supplying base current and, conversely, to turn the element off by withdrawing current from this intermediate region, is disclosed.

The regenerative feature is realized in the four-zone semiconductor switch when the effective alpha or current multiplication factor for the switch exceeds unity. This factor is the sum of the alphas of the two three-zone transistors included within the four-zone element. For descriptive purposes in connection with this disclosure, the four-zone PNPN may be regarded as comprising two three-zone portions which will be termed transistor. The three-zone portion which has the control connection to its intermediate zone is being termed the control transistor and the other three-zone portion the floating transistor. Viewed in this context, each of the three-zone transistors can be considered to be supplying base current to the other three-zone transistor. In order for the switch to remain in the conducting state, the current supplied by one transistor to the base of the other transistor must be sufficient to maintain the saturation condition for that other transistor.

Generally, PNPN semiconductor triode switches are turned off by reducing the bias voltage across the terminal zones of the switch. Although not generally used because of the difficulty encountered under most operating conditions, another method for turning off the switch is by withdrawing sufficient current through the control electrode so that the current in the control transistor is reduced below the current needed to maintain the saturation condition.

A portion of the current through the base of this control transistor is current supplied by the floating transistor and the magnitude of this current is a function of the current multiplication factor or alpha of this other transistor. Consequently, to turn the PNPN switch off with as small a withdrawal of current as possible, it is desirable that the current supplied to the base of the control transistor by the floating transistor be only the amount required to maintain the saturation condition of the control transistor. Therefore, the objectives of this invention can be realized by providing a PNPN semiconductor triode switch in which the sum of the alphas of the two included three-zone transistors only slightly exceeds unity. Ancillary to this limitation on the magnitude of the respective alphas is a further limitation if the PNPN semiconductor triode switch is to be capable of being turned on by relatively small currents through the base, that is, the device is to exhibit large turn-on gain. To achieve turn-on gain, it is necessary for the alpha of the control transistor to have a value approaching unity, typically, between .9 and .99, and, as a consequence, the alpha of the floating transistor will have a value only slightly greater than zero. Accordingly, in an illustrative embodiment of the invention, the alpha of the control transistor is made at least nine times and preferably about 50 times larger than that of the floating transistor, the sum of the two alphas not exceeding 1.1.

In one specific embodiment in accordance with this invention, the low alpha is achieved in the floating transistor portion of a PNPN switch by reducing the injection efficiency $\gamma$ of the floating transistor. In particular, the low injection efficiency is achieved for this portion by making the sheet resistance of its emitter zone much greater than the sheet resistance of its base zone, while the control transistor is constructed as a high alpha transistor in accordance with well-known techniques.

Thus, the principal feature of the invention is the provision of widely different current multiplication factors for the two three-zone transistors included in the four-zone PNPN semiconductor triode switch.

Figure 2:
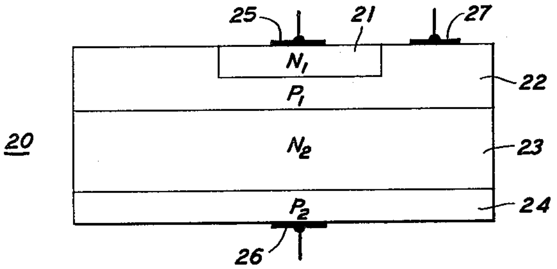
Figure 3:
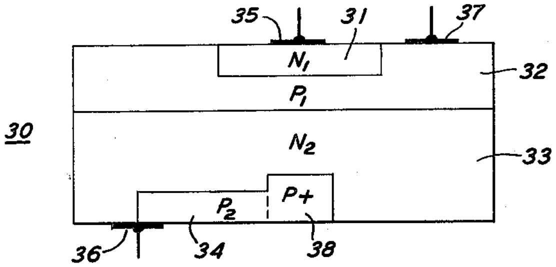
Figure 4:
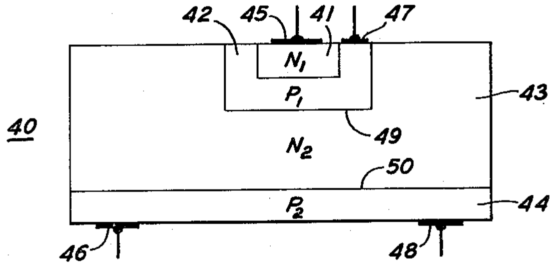

These and other objects and features of the invention will be more clearly understood from the following detailed description taken in connection with the drawing in which:

FIG. 1 is a schematic representation of a four-zone PNPN triode switch for purposes of illustrative analysis; and FIGS. 2, 3 and 4 are particular embodiments of PNPN semiconductor triode switches for attaining the particular objectives of the invention.

FIG. 1 is a schematic representation of the PNPN semiconductor triode switch with various designations applied for explanatory purposes. As indicated by the upper bracket spanning, the PNP portion of the semiconductor, $\alpha_N$ is the direct current gain of the PNP or floating transistor while the lower bracket denotes $\alpha_p$ as the corresponding parameter of the NPN or control transistor. Electrodes and connecting leads are shown to the terminal zones $P_2$ and $N_1$ and to the control base zone $P_1$. The direction of current flow for the polarities chosen are as indicated by the arrows and the current magnitudes are, respectively, $I_c$, $I_e$ and $I_b$.

When the switch is turned on to the low impedance state by a current pulse through the control lead, which pulse then is removed, the floating transistor supplies base current to the control transistor and vice versa. The maximum amount of current that the floating transistor can supply is denoted as $I_{b\ PNP}$ and;

$$I_{b\ PNP}=-\alpha_N I_c \quad (1)$$

To maintain the switch in the conducting state, both the NPN and PNP elements also must be maintained in the conducting condition, and in the case of the NPN element, base current must be supplied so that the charge lost by recombination and other effects is replenished. This current, denoted $I_{b\ min}$, is $$I_{b\ min}=I_e-\alpha_p I_e \quad (2)$$

$$I_{b\ min}=(1-\alpha_p)I_e \quad (3)$$

In the conducting state $\alpha_N+\alpha_p>1$, all of $I_{b\ PNP}$ is not required and the excess is reinjected into the base zone $N_2$.

In order to turn off the PNPN switch to the high impedance, nonconducting state by withdrawal of current through the lead to base zone $P_1$, sufficient current is withdrawn so that the current $I_e$ cannot be maintained. Thus, to achieve turn-off:

$$\alpha_N I_c-I_b<I_{b\ min} \quad (4)$$

$$\alpha_N I_c-I_b<(1-\alpha_p)Ie \quad (5)$$

and, since $$I_e=I_c-I_b \quad (6)$$

then $$(\alpha_N+\alpha_p-1)I_c<\alpha_p I_b \quad (7)$$

Hence, the turn-off gain is defined as $$\frac{I_c}{I_b}=\frac{\alpha_p}{\alpha N+\alpha_p-1} \quad (8)$$

Appreciable turn-off gain, that is, the current switched is large in comparison to the current in the control base lead, therefore is achieved in a PNPN triode switch designed so that in the low impedance, conducting state the sum of the alphas of the three-zone elements is only slightly greater than unity, and further, for turn-on gain the alpha of the control transistor approaches unity and the alpha of the floating transistor approaches zero.

One specific structure exhibiting a high turn-off gain is shown in FIG. 2. The semiconductor wafer 20 comprises four successive zones 21, 22, 23, and 24 of differing conductivity type. Low resistance contacts 25 and 26 are attached to the terminal zones and a third low resistance contact 27 is attached to the intermediate zone 22 which functions as the base of the NPN element of the device.

In this particular structure the injection efficiency $\gamma$ of the $P_2N_2P_1$ transistor comprising zones 24, 23 and 22, respectively, is tailored so as to result in a desirably low alpha. It is known that the injection efficiency of a transistor in which the diffusion length in the emitter and base zones is large compared to the width of the respective zones may be expressed as:

$$\gamma=\frac{R_b}{R_b+R_e} \quad (9)$$

where $R_b$ and $R_e$ are the sheet resistance of the base zone and emitter zones, respectively. To realize a controlled low injection efficiency, $R_e$ is made much greater than $R_b$. Thus, in the device of FIG. 2 base zone 23 has a sheet resistance of about 50 ohms per square and emitter zone 24 a sheet resistance of about 1000 ohms per square. With these values of resistivity, the value of $\alpha_N$ ($P_2N_2P_1$ element) cannot exceed about .05. The value of $\alpha_p$ ($N_1P_1N_2$ element) is made about .99 by conventional methods and the turn-off gain will be about 25.

Typically, the device 20 of FIG. 2 may be made by conventional triple diffusion and masking procedures using a single crystal silicon wafer approximately 50 mils square and 4 mils thick with a starting material of 0.5 ohm-centimeter resistivity. The $N_2$ base zone 23 is of this starting material and is slightly less than four mils (.004 inch) thick to provide the prescribed sheet resistance of 50 ohms per square. The other zones are all much thinner than this zone 23.

Preliminarily, the $P_1$ and $N_1$ zones 22 and 21 are made by successive diffusions of boron and phosphorus, respectively. Both zones are relatively highly doped and the $P_1$ zone 22 has a depth of 0.1 mil after a boron prediffusion at 850 degrees centigrade for 45 minutes and a subsequent diffusion at 1200 degrees centigrade for 45 minutes. The $N_1$ zone 21 then is made by masking all of the wafer but the 10 mils square portion to be diffused and heating in a phosphorus atmosphere at 1050 degrees centigrade for 15 minutes. Its thickness is less than 0.1 mil.

The $P_2$ zone 24 is made by a boron box diffusion in accordance with the disclosure of application Serial No. 740,958, filed June 9, 1958, by B. T. Howard to produce a terminal zone .001 mil thick with the prescribed sheet resistance of 1000 ohms per square. Typically, this step requires a boron diffusion at 850 degrees centigrade for a period of about two minutes.

This box diffusion process does not affect materially the $P_1$ and $N_1$ zones 22 and 21 because of their already high surface concentrations. Accordingly, masking usually is not required. Finally, the low resistance electrodes 25, 26 and 27 are attached by conventional methods.

In the embodiment of FIG. 3 the injection efficiency $\gamma$ of the PNP element is reduced by shunting most of the current around the emitter junction between $P_2$ zone 34 and $N_2$ zone 33. For this purpose the low resistance contact 36 is attached to both zones, particularly to an edge of the $P_2$ zone. Typically, the sheet resistance of the $N_2$ base zone 33 is much smaller, about one-twentieth that of the $P_2$ emitter zone 34. A marked reduction in the injection efficiency of the PNP element results since then approximately nineteen-twentieths of the current flows into the base directly from the contact 36 rather than by injection through the emitter junction. To achieve maximum effectiveness in this structure, the resistance in the $N_2$ base zone 33 is made large compared to the forward resistance of the emitter junction. The P+ portion 38 of the emitter zone is provided so that the current which does flow across the junction consists primarily of holes injected into the $N_2$ zone 33.

Typically, one form of the device 30 of FIG. 3 comprises a silicon wafer, similar in size to the device of FIG. 2, in which the $P_2$ zone 34 is 0.1 mil thick, the $N_2$ zone 33 is 4.0 mils thick, the $P_1$ zone 32 is .04 mil thick, and the $N_1$ zone 31 is .06 mil thick. The $N_2$ zone 33 comprises the starting material of 0.5 ohm-centimeter resistivity and the other zones are produced by conventional techniques similar to those set forth in connection with the embodiment of FIG. 2.

In the device 40 of FIG. 4, a low value of alpha for the floating transistor is achieved by reducing the transport factor $\beta$. In particular, this lower $\beta$ is realized by reducing and centrally locating the cross section of the junction between $N_2$ zone 43 and $P_1$ zone 42, which serves as the collector junction of the floating transistor formed by zones 44, 43 and 42, and by attaching a pair of low resistance electrodes 46 and 48 at the periphery of $P_2$ zone 44, the emitter of this transistor. As a consequence, minority carrier emission tends to concentrate in the vicinity of contacts 46 and 48 and their collection at the $P_1N_2$ junction 49 is diminished. The ratio of the area of the $P_1N_2$ collector junction 49 to that of the $P_2N_2$ emitter junction and the value of the sheet resistance of the $N_2$ base zone 43 and $P_2$ emitter zone 44 are determinative of the value of $\alpha_N$. Considerations relating to the area ratio of the junctions and its effect on emission concentration are disclosed in Patent 2,862,115, issued November 25, 1958, to I. M. Ross and Patent 2,915,647, issued December 1, 1959, to J. J. Ebers and S. L. Miller.

Typically, for a silicon wafer similar in size and shape to the devices described above, the collector junction 49 may be about one-tenth the area of the emitter junction 50.

Although the invention has been described in terms of certain specific embodiments, it will be understood that other arrangements may be devised by those skilled in the art which likewise will be within the scope and spirit of the invention. For example, the conductivity-types of the various zones of the embodiments described can be reversed. Similarly, various other semiconductive materials can be employed, such as germanium or group III–V compounds.

What is claimed is:

1. A semiconductor translating device comprising a semiconductor body including four zones arranged in succession, contiguous zones being of opposite conductivity type thereby forming a PNP semiconductor device, low resistance connections to each terminal zone and to one of said intermediate zones, the other intermediate zone being free of any connection, the effective alpha of one of the three contiguous zones being close to but less than one, and the effective alpha of the other three contiguous zones being close to but greater than zero, the sum of said alphas being only slightly greater than one.

2. A PNPN semiconductor triode switch comprising a semiconductor body including four zones arranged in succession, contiguous zones being of opposite conductivity type, low resistance connections to each terminal zone and to one of said intermediate zones, the other intermediate zone being free of any connection, the effective alpha of the included three-zone element having the connection to its base zone at least nine times the effective alpha of the other included three-zone element, the sum of said alphas being less than 1.1.

3. A PNPN semiconductor triode switch comprising a semiconductor body including four zones arranged in succession, contiguous zones being of opposite conductivity type, low resistance connections to each terminal zone and to one of said intermediate zones, the other intermediate zone being free of any connection and having a value of sheet resistance which is low in comparison to that of the contiguous terminal zone, whereby the effective alpha of the three-zone element including said contiguous terminal zone is not greater than 0.10, the effective alpha of the other three-zone element being greater than 0.90 but less than 1.0.

4. A PNPN semiconductor triode switch in accordance with claim 3 in which said body is a wafer of single crystal silicon and the sheet resistance of said other intermediate zone is about 50 ohms per square and the sheet resistance of said contiguous terminal zone is about 1000 ohms per square.

5. A PNPN semiconductor triode switch comprising a semiconductor body including four zones arranged in succession, contiguous zones being of opposite conductivity type, a first low resistance connection to one of said terminal zones, a second low resistance connection to the intermediate zone contiguous to said one terminal zone and a third low resistance connection both to the other terminal zone and to the other intermediate zone contiguous to said other terminal zone, said other intermediate zone being free of any other connections and having a value of sheet resistance which is small in comparison to that of the contiguous terminal zone, whereby the effective alpha of the three-zone element including said contiguous zone is not greater than 0.1, the effective alpha of the other three-zone element being greater than 0.9 but less than one.

6. A PNPN semiconductor triode switch in accordance with claim 5 in which said body is a wafer of single crystal silicon and the sheet resistance of said other intermediate zone is about 1000 ohms per square and that of said contiguous other terminal zone is about 50 ohms per square.

7. A PNPN semiconductor triode switch comprising a semiconductor body including four zones arranged in succession, contiguous zones being of opposite conductivity type, low resistance connections to each terminal zone and to one of said intermediate zones, the other intermediate zone being free of any connection, said low resistance connection to the terminal zone contiguous to said other intermediate zone being positioned on a peripheral portion of said zone, said one intermediate zone being centrally disposed and having a lateral cross section which is small in comparison to the cross section of the noncontiguous terminal zone.

References Cited in the file of this patent

UNITED STATES PATENTS

| | | |
|---|---|---|
| 2,838,617 | Tummers et al. | June 10, 1958 |
| 2,855,524 | Shockley | Oct. 7, 1958 |

UNITED STATES PATENT OFFICE
CERTIFICATE OF CORRECTION

Patent No. 2,993,154 July 18, 1961

James M. Goldey et al.

It is hereby certified that error appears in the above numbered patent requiring correction and that the said Letters Patent should read as corrected below.

Column 5, line 12, for "II-V" read -- III-V --; line 17, for "PNP" read -- PNPN --.

Signed and sealed this 9th day of January 1962.

(SEAL)
Attest:

ERNEST W. SWIDER
Attesting Officer

DAVID L. LADD
Commissioner of Patents

Notice of Adverse Decision in Interference

In Interference No. 93,491 involving Patent No. 2,993,154, J. M. Goldey and I. M. Ross, Semiconductor switch, final judgment adverse to the patentees was rendered Dec. 16, 1963, as to claim 2.

[*Official Gazette December 22, 1964.*]